US010047868B2

(12) United States Patent
Ertl (10) Patent No.: US 10,047,868 B2
(45) Date of Patent: Aug. 14, 2018

(54) ADJUSTABLE CURTAIN STYLE PORT VALVE DEVICE

(71) Applicant: Ertl Enterprises, Anderson, IN (US)

(72) Inventor: Dan Ertl, Anderson, IN (US)

( * ) Notice: Subject to any disclaimer, the term of this patent is extended or adjusted under 35 U.S.C. 154(b) by 0 days.

(21) Appl. No.: 15/381,598

(22) Filed: Dec. 16, 2016

(65) Prior Publication Data

US 2017/0175907 A1 Jun. 22, 2017

Related U.S. Application Data

(60) Provisional application No. 62/269,158, filed on Dec. 18, 2015.

(51) Int. Cl.
*F16K 5/04* (2006.01)
*F16K 5/10* (2006.01)
*F16K 31/04* (2006.01)

(52) U.S. Cl.
CPC .......... *F16K 5/0442* (2013.01); *F16K 5/0407* (2013.01); *F16K 5/10* (2013.01); *F16K 31/041* (2013.01); *Y10T 137/87137* (2015.04); *Y10T 137/88038* (2015.04)

(58) Field of Classification Search
CPC ........ F16K 5/0442; F16K 31/041; F16K 5/10; F16K 5/0407; Y10T 137/88022; Y10T 137/8803; Y10T 137/88038; Y10T 137/87137
USPC .............................. 251/120–121, 309, 312; 137/614.16–614.18, 637.4
See application file for complete search history.

(56) References Cited

U.S. PATENT DOCUMENTS

| | | | | |
|---|---|---|---|---|
| 671,190 A * | 4/1901 | Haigh | ................... | F16K 11/202 137/614.16 |
| 1,313,590 A * | 8/1919 | Engel | ................... | F16K 11/202 137/605 |
| 2,341,411 A * | 2/1944 | Ojalvo | ...................... | F16K 5/10 116/277 |
| 2,885,179 A * | 5/1959 | Hartmann | ............. | F16K 5/0689 251/315.08 |
| 3,425,451 A * | 2/1969 | Smith | ....................... | F16K 5/10 137/637.4 |
| 3,526,249 A * | 9/1970 | Baustian | ................... | F16K 5/10 137/614.11 |

(Continued)

*Primary Examiner* — John Bastianelli
(74) *Attorney, Agent, or Firm* — C. John Brannon; Kelly J. Smith; Brannon Sowers & Cracraft PC (57) ABSTRACT

An adjustable valve includes a main valve body having a first end portion, an oppositely disposed second end portion, and an endless cylindrical wall extending therebetween. Oppositely disposed flanges, including respective flange apertures, are formed in the endless cylindrical wall for accepting cylindrical fluid conduits. A fluid flow volume is positioned within the main valve body and disposed between the aperture flanges. A plug is controllably insertable through the first end portion into the valve to at least partially obstruct the fluid flow volume. An at least partially hollow cylindrical drum is rotatably connected within the main valve body, wherein the drum has a pair of oppositely disposed drum apertures formed through a wall thereof. The drum is rotatable to at least partially align the pair of oppositely disposed flange apertures to define an unobstructed fluid flow path through the valve body.

14 Claims, 10 Drawing Sheets

(56) References Cited

U.S. PATENT DOCUMENTS

| | | | | |
|---|---|---|---|---|
| 3,610,286 A | * | 10/1971 | McGowen, Jr. | F16K 5/0605 |
| | | | | 137/327 |
| 3,730,222 A | * | 5/1973 | Moen | F16K 11/078 |
| | | | | 137/625.17 |
| 3,860,032 A | * | 1/1975 | Rogers | F16K 5/0605 |
| | | | | 137/614.17 |
| 6,290,207 B1 | * | 9/2001 | Genga | F16K 31/046 |
| | | | | 251/174 |
| 2007/0144483 A1 | * | 6/2007 | Torii | F02D 9/103 |
| | | | | 123/337 |
| 2013/0153805 A1 | * | 6/2013 | Stulik | F16K 5/0207 |
| | | | | 251/315.16 |

* cited by examiner

ADJUSTABLE CURTAIN STYLE PORT VALVE DEVICE

CROSS-REFERENCE TO RELATED APPLICATION

This patent application claims priority to U.S. Provisional Patent Application Ser. No. 62/269,158, filed on Dec. 18, 2015.

TECHNICAL FIELD

This patent application relates generally to the field of mechanical engineering, and, more particularly, to a high-precision control valve.

BACKGROUND

Flow control valves are useful for fluid control applications wherein the volume and flow rate of the fluid must frequently be varied. This type of control valve operates by varying the size of the flow passage to allow more or less fluid to flow therethrough. Typically, a flow control valve includes a valve actuator, a modulating element, a valve positioner, and a valve body, which all cooperate to regulate fluid flow.

The valve body generally houses or supports a passage for fluid to pass therethrough, as well as the modulating element such as, for example, a drum, plug, globe, ball, butterfly or the like, which may be moved to change the rate of fluid flow through the valve body. The valve actuator is connected to the modulating element to manipulate the same, and the valve positioner ensures that the valve has achieved the desired degree of opening to enable the desired fluid flow therethrough.

One drawback with conventional flow control valves occurs when the fluid flow passage size is changed to vary the flow rate. If the sectional shape of the passageway changes as the size of the passage changes, such as happens when circular passageways are eclipsed, flow dynamics likewise change. Further, the change in flow with such valves is not linear with the change in size of the passage.

One conventional valve design includes an adjustable drum that may be moved to vary flow through the valve. However, this design shares a shortcoming with many control valves insofar as it includes a linkage between a handle connecting to the drum modulating element and the valve actuator. This linkage or armature inherently includes some play that must be overcome when the actuator is energized to move the handle, resulting in control hysteresis that lowers control accuracy.

Other conventional valve designs include actuators directly engaging "non-drum" modulation elements, thus contributing to improved accuracy. However, these designs suffer limitations in adjustability arising from the modulating element being inherently less adjustable.

There remains a need for a flow control valve having improved adjustability and accuracy. The present disclosure addresses this need.

SUMMARY OF THE INVENTION

In one aspect, an adjustable valve includes a main valve body having a first end portion, an oppositely disposed second end portion, and a cylindrical wall extending therebetween. Oppositely disposed flanges, including respective flange apertures, are formed in the cylindrical wall for accepting cylindrical fluid conduits. A fluid flow volume is positioned within the main valve body and disposed between the aperture flanges. A plug is controllably insertable through the first end portion into the valve to at least partially obstruct the fluid flow volume. An at least partially hollow cylindrical drum is rotatably connected within the main valve body, wherein the drum has a pair of oppositely disposed drum apertures formed through a wall thereof. The drum is rotatable to at least partially align the pair of oppositely disposed flange apertures to define an unobstructed fluid flow path through the valve body.

In another aspect, a method of controlling fluid flow with an adjustable valve is provided. The adjustable valve includes a main valve body having a first end portion, an oppositely disposed second end portion, and a cylindrical wall extending therebetween. Oppositely disposed flanges are formed in the cylindrical wall, wherein each respective flange has a respective flange aperture formed therethrough. A plug is controllably insertable through the first end portion into the valve body. An at least partially hollow cylindrical drum is rotatably connected within the main valve body, wherein the drum has a pair of oppositely disposed drum apertures formed therethrough. The method includes a step of advancing a fluid through a fluid flow volume positioned in the main valve body and disposed between the respective aperture flanges. The method also includes steps of adjusting obstruction of the fluid flow volume by the plug by inserting or retracting the plug relative to the valve body, and adjusting a flow coefficient of the fluid by rotating the drum relative to the main valve body to at least partially align the pair of oppositely disposed drum apertures with the pair of oppositely disposed flange apertures.

DETAILED DESCRIPTION

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

The accompanying drawings, which are incorporated in and constitute a part of this specification, illustrate one embodiment of an adjustable curtain style port valve device, also referred to herein as an adjustable valve, 31. The drawings together with the summary description given above and a detailed description given below serve to explain the principles of the adjustable valve 31. It is understood, however, that the adjustable port valve 31 is not limited to only the precise arrangements and instrumentalities shown.

FIGS. 1-4 illustrate the exemplary adjustable valve 31 of the present disclosure, with components and features noted. In particular, these views depict: an adjustable valve 31; a main valve body 54 having a first end portion 1 and a second end portion 2, and a cylindrical wall 3 extending therebetween; a main body aperture 95 extending completely through main valve body 54 where cylindrical fluid conduits 97, 98 (shown in later FIGS.) may attach on opposing sides thereof; more particularly, cylindrical fluid conduits 97, 98 (FIG. 9) may attach at oppositely disposed flanges (for example, 94) formed in the endless cylindrical wall 3, with each flange 94 defining a flange aperture 5 formed therethrough.

According to some embodiments, the flange apertures 5 may have quadrilateral shapes. Further, the flange apertures 5 may have square shapes. In addition, the respective flanges 94 may be recessed relative to an outer surface 4 of the cylindrical wall 3, and a recessed area extending between the outer surface 4 and each of the respective flanges 94 may have a cylindrical shape. The shapes of these areas may result in a more linear, and predictable, change in flow with a corresponding change in flow passage size, as compared to conventional designs.

Continuing on, FIGS. 1-4 also depict a shaft 52 (open/close) extending through an adapter plate 50 and a top plate 51 at the second end portion 2; an adjusting screw 58 extending through a bottom plate 56; a maximum flow cross-sectional area, or fluid flow volume, 91A within the main valve body 54 and disposed between flange apertures 5; a lower port gate or plug 55 controllably insertable through the first end portion 1 into the main valve body 54 to at least partially obstruct the fluid flow volume 91A; the adjusting screw 58 operationally connected to the plug 55 to move the same; an upper port gate or partially hollow cylindrical drum 53 rotatably connected within the main valve body 54; the rotatable shaft 52 being operationally connected to the drum 53. According to some embodiments, the plug 55 may be received within the drum 53.

As will be described herein, the plug 55 is adjustable to define a maximum flow volume 91A corresponding to an outlet diameter of at least one of the cylindrical fluid conduits 97, 98. In addition, and independently, the drum 53 is rotatable to define a flow coefficient of fluid passing through the adjustable valve 31, with an aperture 91 formed between the drum 53 and main valve body 54. As such, the adjustable valve 31 may be described as having a variable port 35. The drum 53 may be movable by any of a variety of different actuators 100, electric, pneumatic or the like. It should be appreciated that a number and variety of various known components, such as fasteners 41, such as, for example, hex head bolts or equal, retaining ring 42 or E-Clip or equal, fasteners 43, such as socket heads or equal, may be incorporated into the adjustable valve 31 and used to maintain and/or fix desired positions of the various components.

Figure 1:
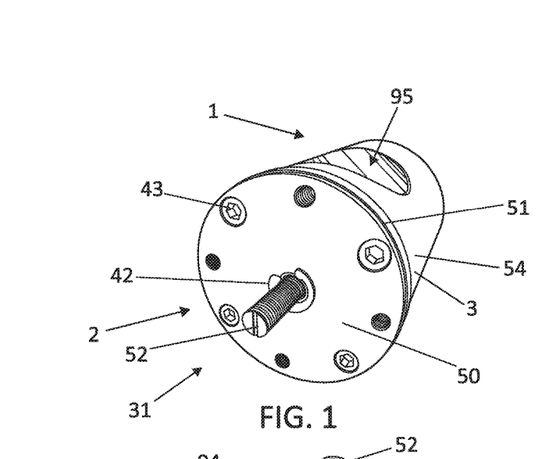
FIG. 1 is a first perspective view of an exemplary adjustable valve, according to the present disclosure.
Figure 2:
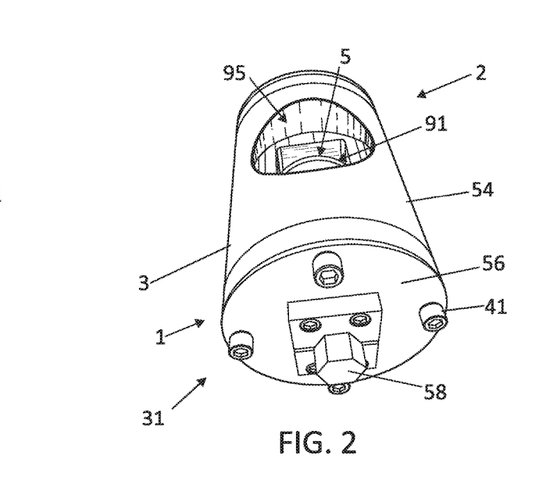
FIG. 2 is a different perspective view of the exemplary adjustable valve of FIG. 1.
Figure 3:
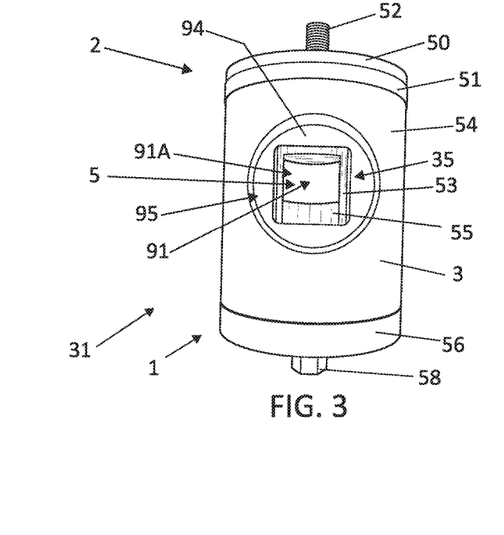
FIG. 3 is another perspective view of the exemplary adjustable valve of FIGS. 1 and 2.
Figure 4:
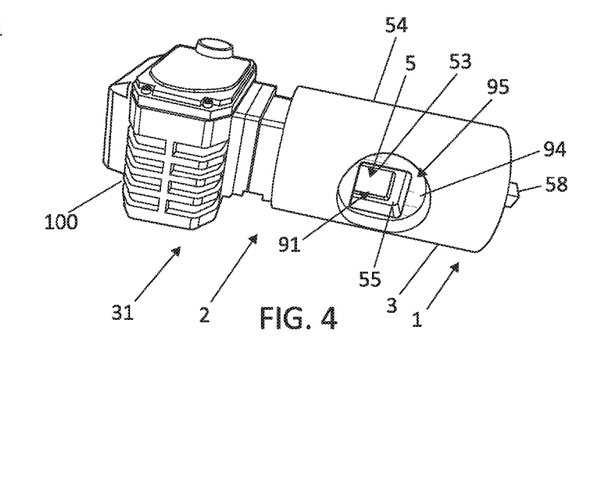
FIG. 4 is yet another perspective view of the exemplary adjustable valve of FIGS. 1, 2, and 3, shown with an actuator attached thereto.
Figure 5:
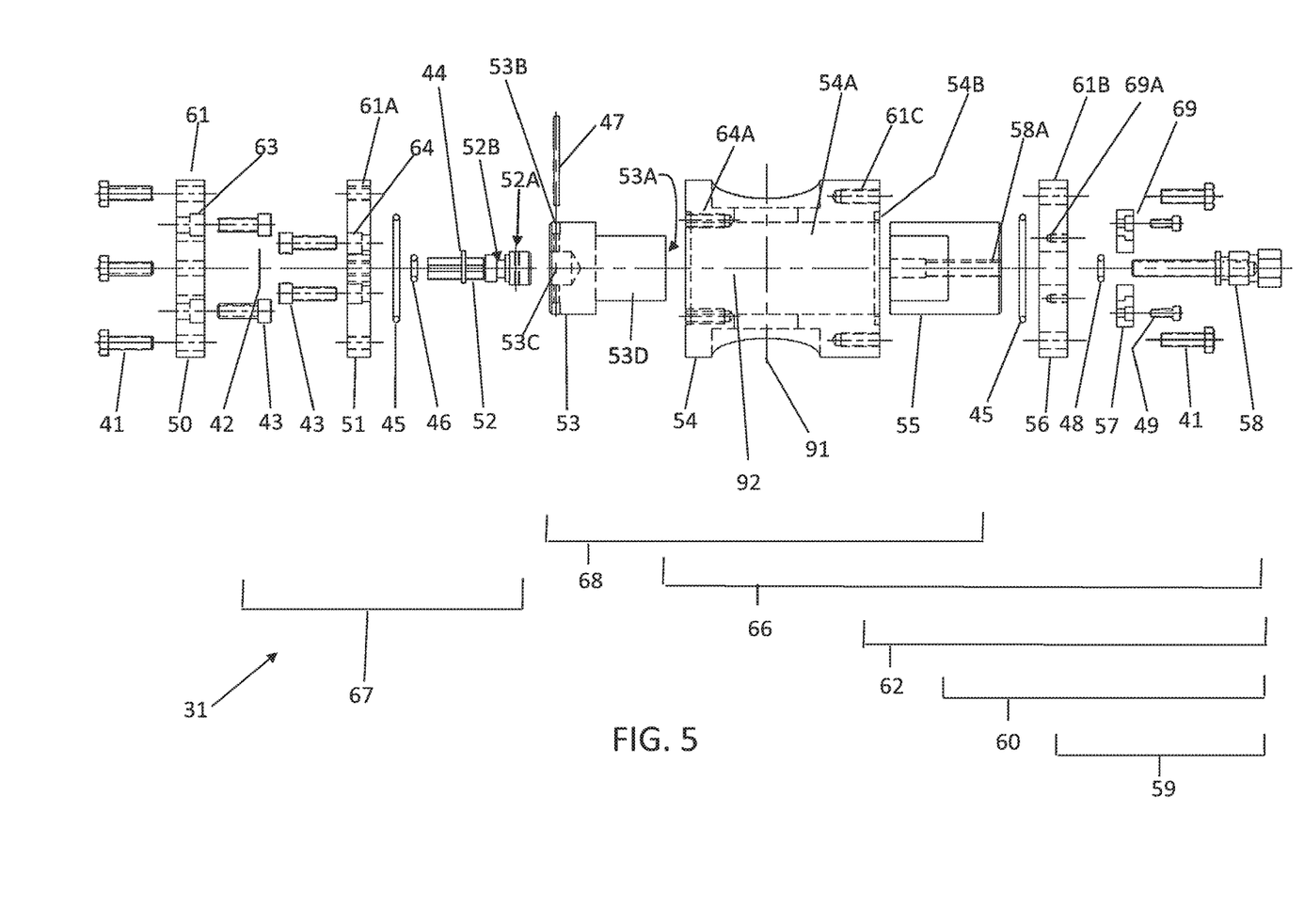
FIG. 5 is an exploded cross-sectional view of the exemplary adjustable valve of the present disclosure.

FIG. 5 is an exploded cross-sectional view of the adjustable valve, or adjustable port valve, 31 of the previous FIGS, with similar components being called out with similar reference numerals. Various assemblies or groups of component parts are also called out. In particular, the following assemblies are shown: adjusting screw assembly 59 including the adjusting screw 58; completed adjusting screw assembly 60 comprised of adjusting screw assembly 59 with bottom plate 56 and cap plates 57; lower gate assembly 62 with completed adjusting screw assembly 59 and lower gate 55; completed lower gate 55 and main body assembly 66 comprised of lower gate assembly 62 into the main valve body 54; valve assembly main valve body 68 with lower gate assembly 62 and upper gate 53; and open/close shaft assembly 67 comprised of open/close shaft 52, round shims 44, O-ring 45, and E-clip 42. Assembly of the various components will be discussed in greater detail below.

Figure 6:
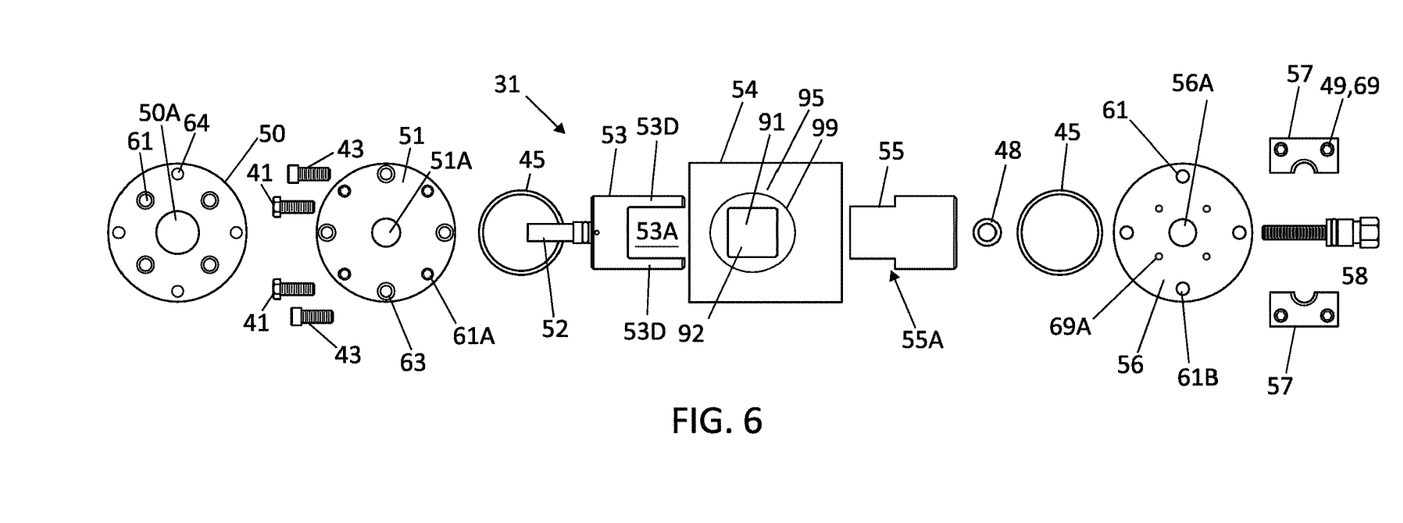
FIG. 6 is partially exploded perspective view of the exemplary adjustable valve of the present disclosure.

FIG. 6 is a perspective view of partially exploded components of the exemplary adjustable valve 31. For example, the depicted components include: fasteners 41 such as hex head bolts or equal; retaining ring 42 or E-Clip or equal; fasteners 43 such as socket heads or equal; O-ring seal 45 or equal; small O-ring seal 48 or equal; fasteners 49 such as socket head cold roll steel or equal; adapter plate 50; aperture 50A in adapter plate 50 for shaft 52; top plate 51; aperture 51A for shaft 52; shaft 52 (open/close); upper port gate or drum 53; opening/aperture/slot 53A in upper port gate 53 defined by axial wall projections 53D; main valve body 54; lower port gate or movable plug, which may be a cylindrical plug, 55; flat 55A for "U" in lower port gate 55; bottom plate 56; aperture 56A for adjust screw 58; cap plate 57; adjusting screw 58 (fastener); plate 50 opening shredder 61 for fasteners 41; plate 51 threads 61A for 41; shoulder/opening 61B in plate 56 for fasteners 41; threads 61C in main valve body 54 for fasteners 41; plate 50 shoulder/opening 63 for fastener 43; shoulder/opening 64 in plate 51 for fasteners 44; shoulder/opening 69 in caps for fastener 49; threads 69A in plate 56 for fasteners 49; conduit/aperture 91 formed between upper gate 53/53A and main valve body 54/54A; main body 54 flange 94 where input and output piping, also referred to as cylindrical fluid conduits, 97, 98 connect; and means 99 to connect piping 97, 98 to device 31 (threaded, welded, etc.) at aperture 95 of main body 54.

Figure 7A:
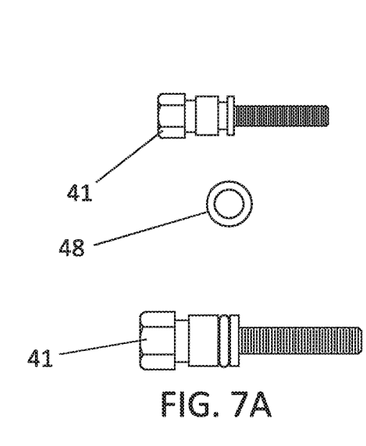
FIGS. 7A-7X are perspective views of components of the adjustable valve of the present disclosure at various stages of assembly.
Figure 7B:
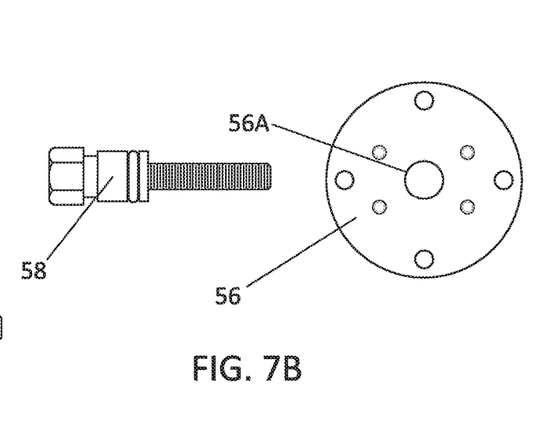
Figure 7C:
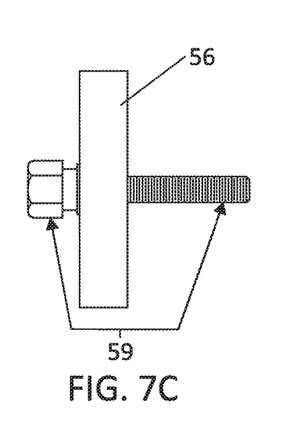
Figures 7D, 7E:
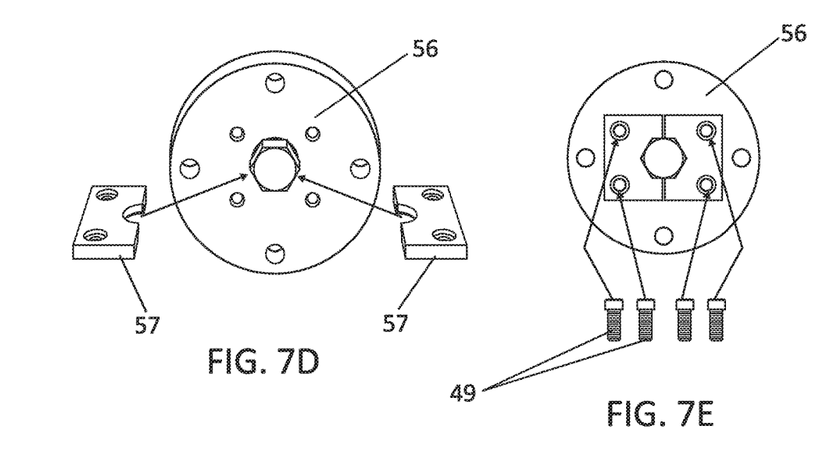
Figure 7F:
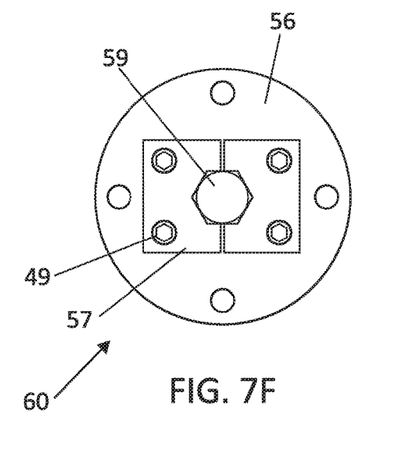
Figures 7G, 7H:
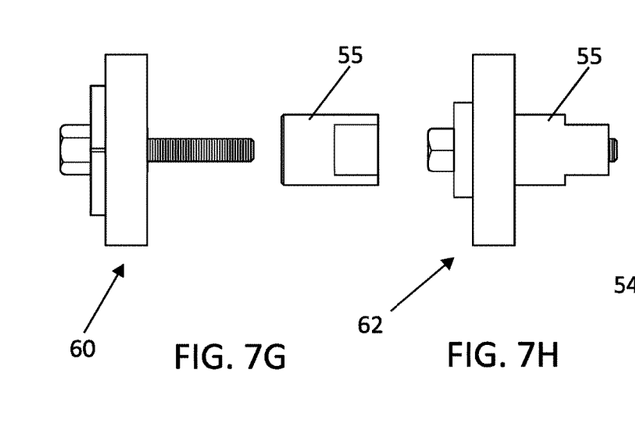
Figure 7I:
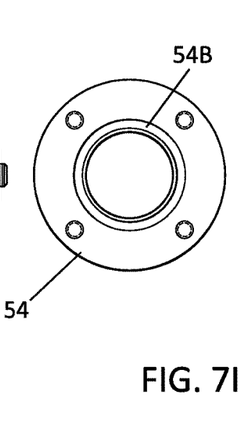
Figure 7J:
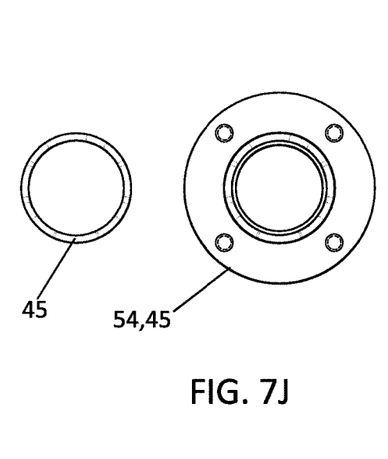
Figure 7K:
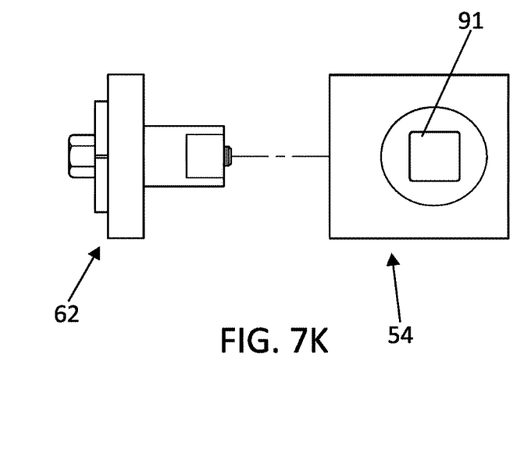
Figure 7L:
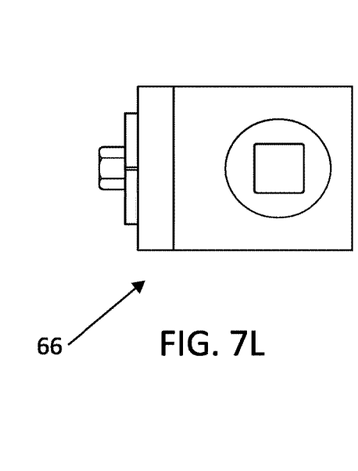
Figure 7M:
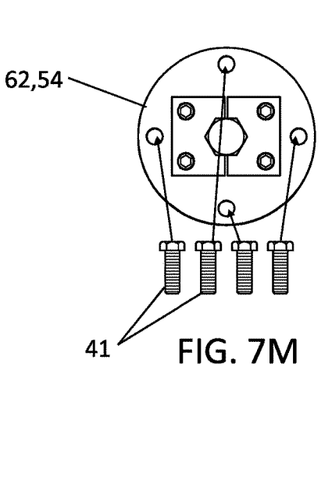
Figure 7N:
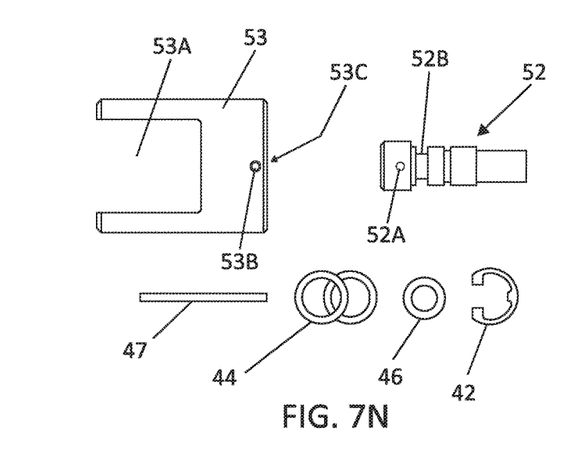
Figure 7O:
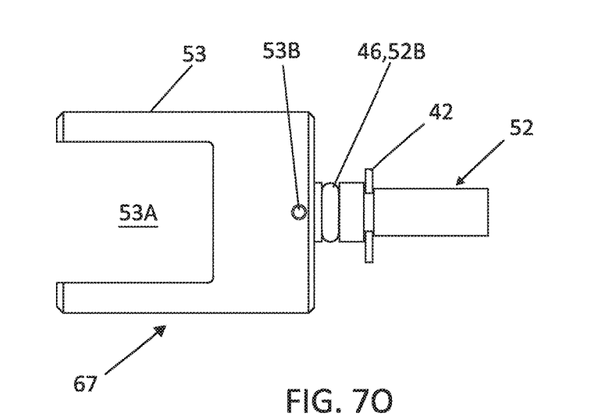
Figure 7P:
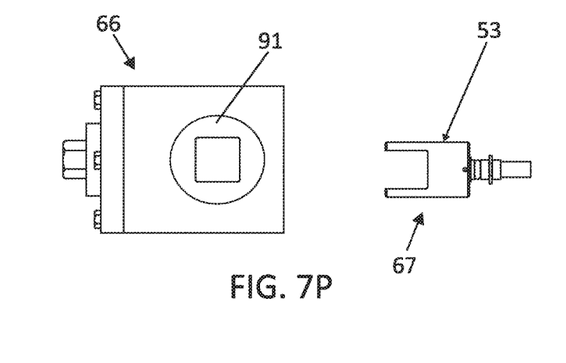
Figure 7Q:
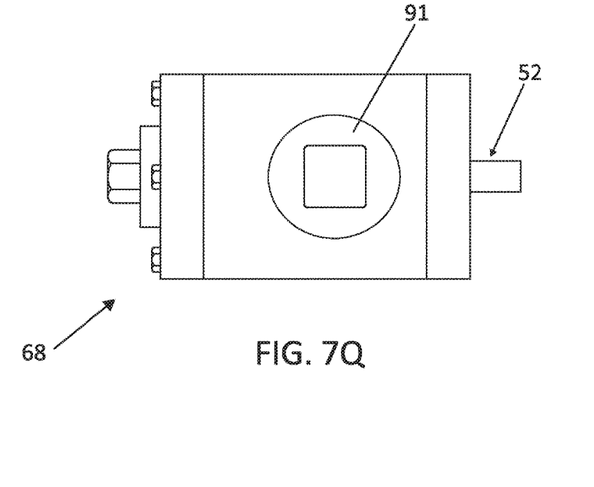
Figures 7R, 7S:
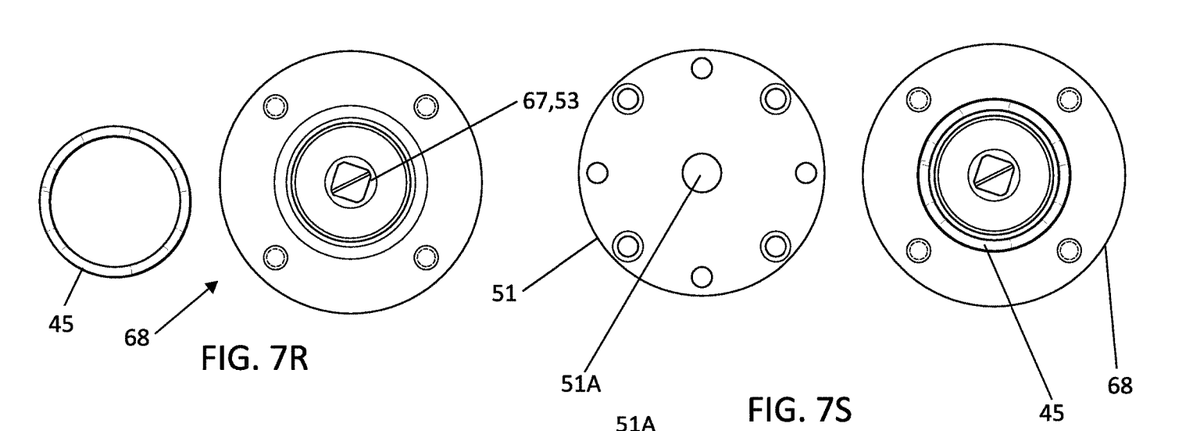
Figure 7T:
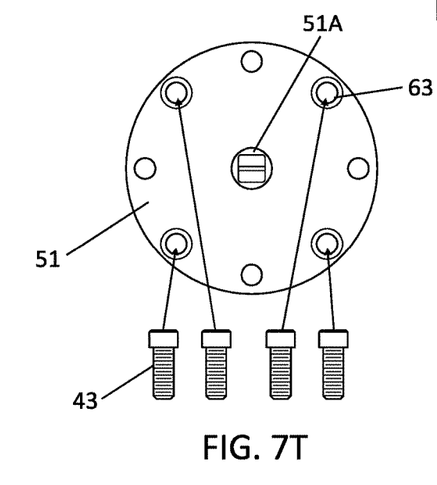
Figure 7U:
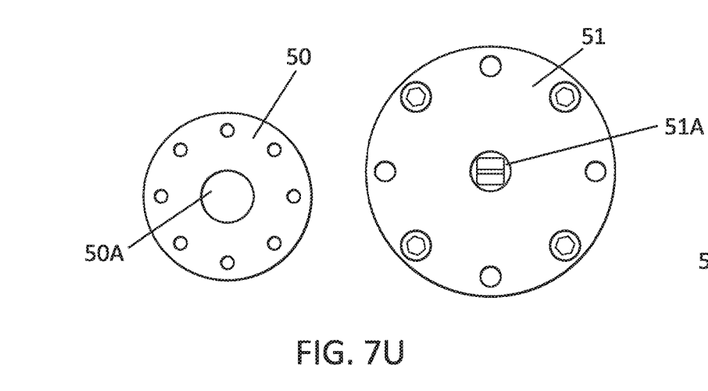
Figure 7V:
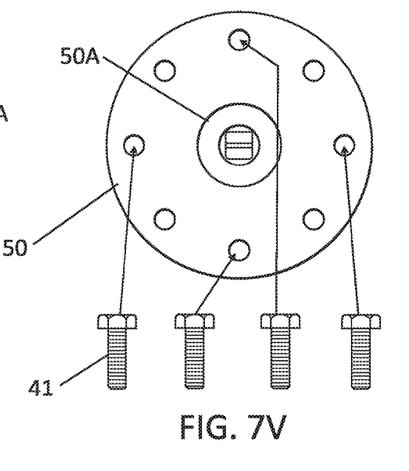
Figure 7W:
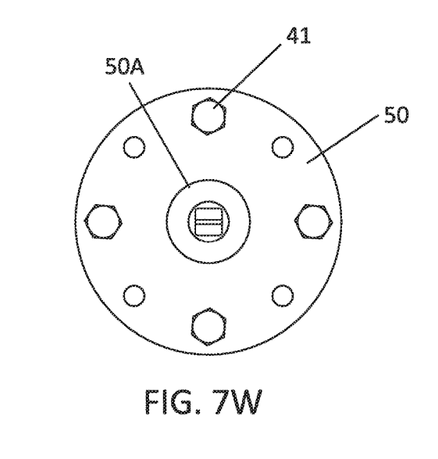
Figure 7X:
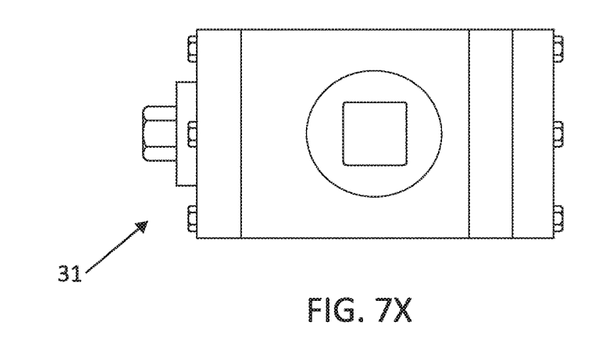
Figure 8:
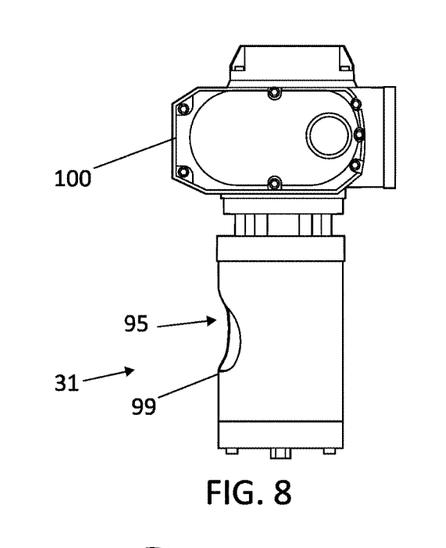
FIG. 8 is a perspective view of the exemplary adjustable valve, shown with an exemplary actuator attached thereto.
Figure 9:
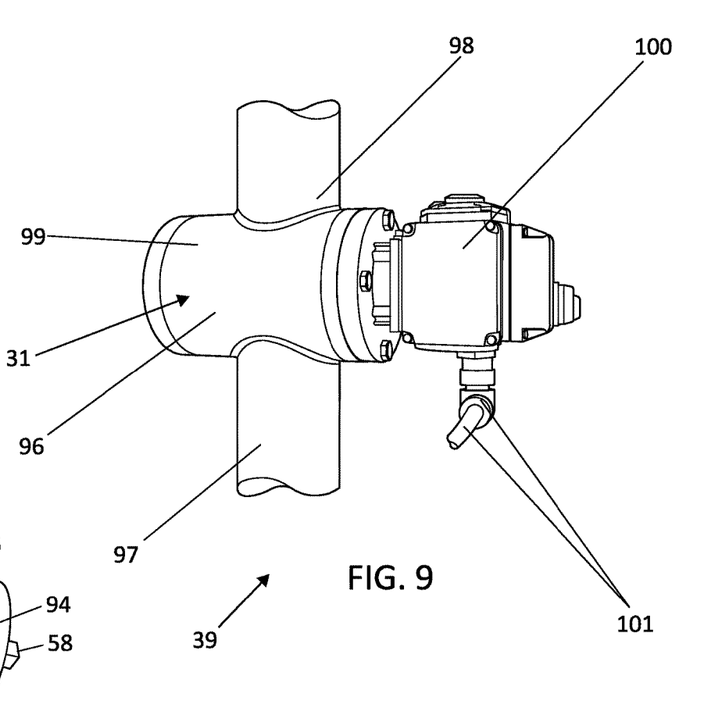
FIG. 9 is a perspective view of the exemplary adjustable valve, shown installed in an exemplary pipe train application.
Figure 10:
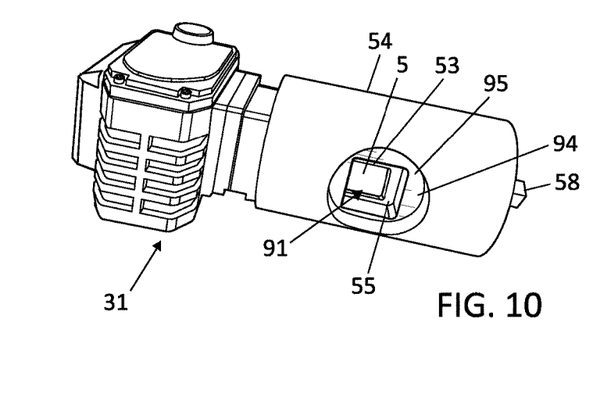
FIG. 10 is another perspective view of the exemplary adjustable valve with an actuator attached thereto, similar to the view of FIG. 8.
Figure 11:
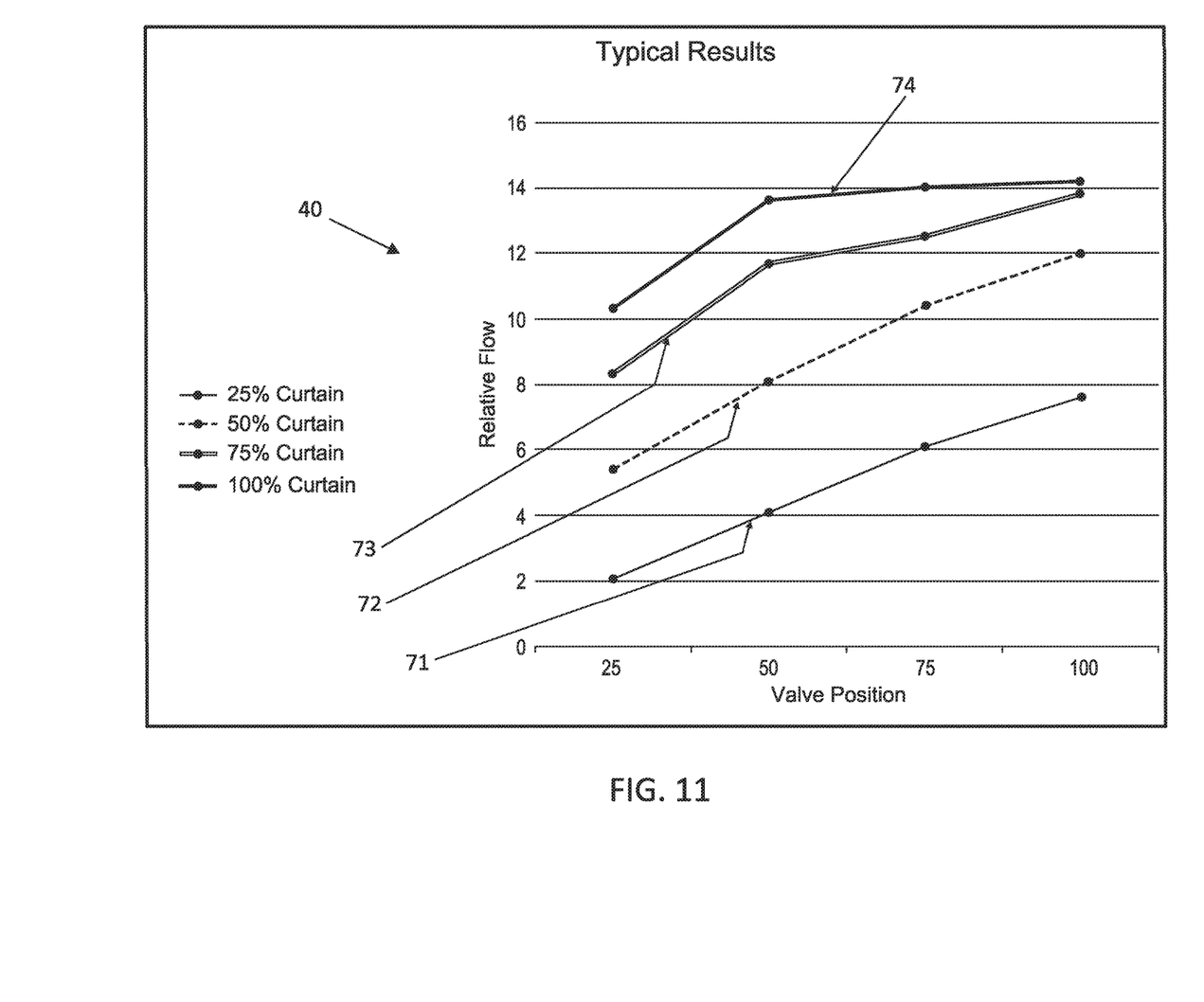
FIG. 11 is chart depicting output flow of the adjustable valve disclosed herein, as a function of valve position.

FIGS. 7A through 7X are views illustrating a method for assembly of the adjustable valve 31. FIGS. 8 and 10 are illustrations of the adjustable port valve 31 with an exemplary actuator 100 attached. FIG. 9 is an adjustable valve 31 installed in a pipe train application. FIG. 11 is a chart depicting adjustable valve output flow as a function of valve position.

The details mentioned here are exemplary and not limiting. Other specific components and manners specific to describing an adjustable valve 31 may be added as a person having ordinary skill in the field of curtain valve devices and valve systems for fluids and gasses and their uses well appreciates. The adjustable valve 31 may be assembled as shown below in FIGS. 7A through 7X. The adjustable valve 31 may then be engaged with an actuator, such as actuator 100, to control the adjustable valve 31. Examples of actuator devices are shown in: FIGS. 8 and 10.

Generally speaking, the assembly of adjustable valve 31 may include the following steps:

1. Grease or otherwise lubricate an appropriately sized (such as the size 206) O-ring 48 and slide it onto the first groove of the adjusting screw 58, as shown in FIG. 7A.
2. Insert this combination through a center hole 56A of bottom plate 56, as shown in FIGS. 7B and 7C, resulting in adjusting screw assembly 59.
3. Put cap plates 57 in position and insert the one-half inch cap screws 49, as shown in FIGS. 7D and 7E.
4. Tighten the one-half inch cap screws 49 so that the assembly looks like FIG. 7F. This is a completed adjusting screw assembly 60 defining adjusting screw assembly 59 with bottom plate 56 and cap plates 57.
5. Fasten the lower gate 55 on, as shown in FIGS. 7G and 7H. A completed lower gate assembly 62 includes completed adjusting screw assembly 60 and lower gate 55.
6. Place an O-ring or, more typically, double O-rings 45 into its slot 54B on the side of the main valve body 54, as seen in FIGS. 7I and 7J. Make sure to place the O-ring(s) on the side that is farthest from the port 91 that goes through the main valve body 54.
7. Insert the competed lower gate assembly 62 into the main valve body 54, as shown in FIGS. 7K and 7L. Insert the lower gate assembly 62 on the side of the main valve body 54 that is farthest from the port 91 through the main valve body 54. Verify that the O-ring(s) 45 is still in place. A completed main valve body 54 with lower gate assembly 66 defines completed lower gate assembly 62 into the main valve body 54.
8. Attach the lower gate assembly 62 and the main valve body 54 together using four one-inch long hex bolts 41, as shown in FIG. 7M.
9. Stack the round shims 44 on top of each other and slide them into position on the open/close shaft 52, as shown in FIGS. 7N and 7O.
10. Slide an O-ring or, more typically, double O-rings 46 into position (groove 52B) on the open/close shaft 52, along with shims 44 and e-clip 42 as shown in FIGS. 7N and 7O. One may need to use a paper clip to assist in this. Unfold the paper clip and put one end through the O-ring(s) 46. Then place both ends of the paper clip together, so that one has a paper clip loop through the O-ring 46. Then one uses this to help pull the O-ring(s) 46 into position, if necessary. An open/close shaft assembly 67 is comprised of open/close shaft 52, round shims 44, O-ring(s) 46, and e-clip 42.
11. Insert the side mount E-clip 42 into position on the open/close shaft 52, as shown in FIGS. 7N and 7O.
12. Insert the roll pin 47 into one side of the upper gate 53 at aperture/hole 53B.
13. Urge the roll pin 47 into the aperture/hole 53B. Typically, insert the roll pin 47 just far enough that it doesn't quite go through to the inside of aperture/hole 53B at shaft recess 53C.
14. Insert the open/close shaft 52 into the upper gate 53 at recess 53C and align the roll pin 47 and shaft 52 aperture/hole 52A.
15. Urge the roll pin 47 in as far as it will go into the aperture/holes 52A, 53B without denting the upper gate 53, as seen in FIGS. 7N and 7O.
16. Insert the upper gate 53 with the open/close shaft assembly 67 into the main valve body w/lower gate assembly 66, as shown in FIGS. 7P and 7Q. Rotate the upper gate 53 so that it aligns with the lower gate 55 and slides into place. Valve assembly 68 defines main valve body with lower gate 66, 62, 54 and upper gate shaft 67 assemblies.
17. Pivot the main valve 68 on its end so that the open/close shaft assembly 67 and upper gate 53 is facing up. Then, place the second size 228 O-ring 45 into position, as shown in FIG. 7R.
18. Place the top plate 51 into position and fasten using four three-quarter inch cap screws 43, as shown in FIGS. 7S and 7T into apertures 63. The top plate 51 has a smaller center hole 51A than the other aperture 50A in the remaining adapter 50 plate. Make sure that the top plate 51 is inverted and positioned such that the recesses/counter sunk of the apertures/holes 63, 61A are visible, as shown.
19. Place the adapter plate 50 into position and fasten using four one-inch long hex bolts 41, as shown in FIGS. 7U, 7V, and 7W into apertures 61. Make sure that the plate 50 is inverted and positioned so that the recesses in the inner holes are not visible.

FIG. 7X shows an assembled adjustable valve 31.

FIGS. 8 and 10 are perspective views of the adjustable curtain style port valve 31 with an actuator 100 operationally connected thereto. FIG. 9 is an adjustable curtain style port valve 31 installed in a pipe train application. Shown here are: the adjustable curtain style port valve 31; mounted 39 improved adjustable curtain style port valve 31 and actuator 100 on pipe train 96; upper port gate 53; main valve body 54; lower port gate 55; aperture 91 formed between upper gate 53/53A and main valve body 54/54A; main body 54 aperture 95 where input/output piping 97,98 connect; pipe train 96; input pipe 97 of pipe train 96; means 99 to connect piping 97, 98 to device 31 (threaded, welded, etc.) at aperture 95 of main body 54; actuator 100; and actuator power and control means 101.

FIG. 11 is a chart showing the improved adjustable curtain style port valve output flow versus valve position—i.e. valve opening (e.g., as adjusted using plug 55) and curtain position varied (e.g., as adjusted using drum 53). The control chart and curves shown are: the output chart 40 for the improved adjustable curtain style port valve device; 25 percent curtain engaged—curve 71; 50 percent curtain engaged—curve 72; 75 percent curtain engaged—curve 73; and 100 percent curtain engaged—curve 74.

Many uses are anticipated for the adjustable curtain style port valve 31. Some examples, and not limitations, are: fluid flow control (oil, water, various solutions); gas flow control (combustible gas, oxygen, steam); combustion systems; and replacement for less precise adjustable port valve. Typically, all components of the valve system 31 are oxygen-compatible and are made of materials that may safely be used with flowing oxygen, such as stainless steel, ceramics, cements, or the like. Further, multiple points of sealing are typically employed, such as double O-rings or sequentially arrayed seals.

In operation, an actuator, such as an electric motor, pneumatic actuator, or the like, is operationally connected to drum 53, typically through elongated cylinder 52. Plug 55 is partially inserted into the valve body 54 to partially occupy conduit space 92 to define a maximum flow cross-sectional area 91A. Plug 55 may be inserted into space 91 by controllably turning adjust screw 58, which may be done manually or automatically, such as by a servo or like motor operationally connected to screw 58 and an electronic controller.

Once plug 55 is set to define the maximum cross-sectional area, drum 53 may be controlled to decrease or increase the effective cross-sectional area between zero (shutting off fluid flow through the valve 31) and the predetermined maximum by varying the portion of the window or aperture 53A that is aligned with aperture 91, such as by energizing the electric motor (typically by sending signals from the electronic controller) to turn or pivot elongated cylinder by a predetermined amount.

The present novel technology relates to a variable port valve 31 that allows for the flexibility to more linearly match the valve opening to a desired flow range, allowing more precise control. The shaft and universal mounting pad are conducive to a variety of actuators, making it simple and easy to install. The innovative design of the valve 31 allows the user to match the effective valve size to line size and then use the variable port adjustment to span the opening to match the flow. Actuation of the drum linearizes the flow from full-open to full-closed, allowing for greater precision in control. This low maintenance valve 31 is capable of handling a wide variety of fluids and pressures.

The valve 31 can operate at very low torque and has the ability to be adjusted to a range of flow coefficients. One practical advantage is that fewer valves must be maintained in commercial inventory to meet demand for a full range of valve sizes. The valves 31 can have a variety of utilities in a wide range of sizes enabling operation by a simple and inexpensive actuator. Typically, the valves 31 enjoy a long lifespan and can be easily replaced or repaired as needed.

The present novel technology relates to valves used in industrial or plant settings that involve the distribution of fluids, and more specifically to a directional-control valve for connection between two pipes. The variable port 35 allows for the flexibility to match the valve opening to the maximum flow range, yielding more precise control. The shaft and universal mounting pad are conducive to a variety of actuators, making it simple and easy to install.

The advantages for the adjustable port valve 31 are identified throughout. Succinctly, the benefits include: no abrupt "rapid" change in volume; more precise control of fluid/gas flow; fewer parts in control device; and threaded and non-threaded assembly built and assembled on existing process equipment; variable port allows for the flexibility to match the valve opening to the maximum flow range; cost effective design; matches the valve size to the line size and then use the variable port adjustment to span the opening to match the flow; made from various durable materials—carbon steel, stainless steel, brass, composite materials etc.

With this description it is to be understood that the valve 31 is not to be limited to only the disclosed embodiment of product. The features of the adjustable curtain style port valve device called a valve 31 are intended to cover various modifications and equivalent arrangements included within the spirit and scope of the description.

While the present novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a number of insubstantial changes and modifications to the above-described embodiments and that it would be impractical to attempt to describe all such embodiment variations in the present specification. Accordingly, it is understood that all changes and modifications that come within the spirit of the present novel technology are desired to be protected.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

LIST OF ELEMENTS

| Ref # | Description |
|---|---|
| 1 | first end portion |
| 2 | second end portion |
| 3 | endless cylindrical wall |
| 4 | outer surface |
| 5 | flange aperture |
| 31 | adjustable curtain style port valve device (adjustable valve) |
| 35 | variable port |
| 39 | Mounted/installed adjustable valve |
| 40 | output chart |
| 41 | Fasteners |
| 42 | retaining ring, E-Clip or equal |
| 43 | fasteners |
| 44 | round shims |
| 45 | O-ring seal or equal (Viton or equal) |
| 46 | small O-ring seal or equal |
| 47 | holding/roll pin or equal |
| 48 | small O-ring seal or equal (Viton, etc.) |
| 49 | fasteners such as socket head cold roll steel or equal |
| 50 | adapter plate |
| 50A | aperture in adapter plate for shaft |
| 51 | top plate |
| 51A | aperture for shaft |
| 52 | shaft (open/close) |
| 52A | aperture for roll pin |
| 52B | groove for O-ring |
| 53 | upper port gate/drum |
| 53A | opening/aperture/slot in upper port gate |
| 53B | aperture in upper port gate for roll pin |
| 53C | aperture/recess in upper port gate for shaft |
| 54 | main valve body |
| 54A | main body opening/aperture/port |
| 54B | O-ring slot |
| 55 | lower port gate/plug |
| 55A | flat for "U" in lower port gate |
| 56 | bottom plate |
| 56A | aperture for adjust screw |
| 57 | cap plate |
| 58 | adjusting screw (fastener) |
| 58A | threads in lower port valve |
| 59 | adjusting screw assembly |
| 60 | completed adjusting screw assembly comprised of adjusting screw assembly with bottom plate and cap plates |
| 61 | plate opening shredder for fasteners |
| 61A | plate threads |
| 61B | shoulder/opening in plate for fasteners |
| 61C | threads in main valve body for fasteners |
| 62 | lower gate assembly with completed adjusting screw assembly and lower gate |
| 63 | plate shoulder/opening for fastener |
| 64 | shoulder/opening in plate for fasteners |
| 64A | threads in main body for fasteners |
| 66 | completed lower gate and main body assembly comprised of lower gate assembly into the main valve body |
| 67 | open/close shaft assembly comprised of open/close shaft, round shims, O-ring (size 204), and E-clip |
| 68 | valve assembly main valve body with lower gate and upper gate shaft |
| 69 | shoulder/opening in caps for fastener |
| 69A | threads in plate for fasteners |
| 71 | 25 percent curtain engaged-curve |
| 72 | 50 percent curtain engaged-curve |
| 73 | 75 percent curtain engaged-curve |
| 74 | 100 percent curtain engaged-curve |
| 81 | prior art valve |
| 82 | prior art valve |
| 83 | prior art valve |
| 84 | prior art valve |
| 85 | prior art valve |
| 86 | prior art valve |
| 87 | prior art valve |
| 88 | prior art valve |
| 89 | prior art valve |

-continued

| Ref # | Description |
|---|---|
| 91 | aperture or conduit formed between upper gate and main valve body |
| 91A | maximum flow cross-sectional area/fluid flow volume |
| 95 | main body flange where input/output piping connect |
| 96 | pipe train |
| 97 | input pipe of pipe |
| 98 | output pipe of pipe train |
| 99 | means to connect piping to device (threaded, welded, etc.) at aperture of main body |
| 100 | Actuator |
| 101 | actuator power and control means |
| 102 | means for fastening such as 8 mm cap screws |
| 103 | adjustable valve assembly with DCL actuator |
| 104 | SQM5 actuator |
| 105 | SQM5 adapter Blocks |
| 106 | means for fastening such as ¼" hex bolts |
| 107 | means for fastening such as ¼" hex nuts |
| 108 | adapter block assembly |
| 109 | SQM5 adapter plate/structure with front and back surfaces |
| 109A | open space between the front and back surfaces of SQM5 adapter plate/structure |
| 110 | means for fastening such as cap screws |
| 111 | adjustable valve assembly with SQM5 actuator |

What is claimed is:

1. A method of controlling fluid flow with an adjustable valve, the adjustable valve including: a main valve body having a first end portion, an oppositely disposed second end portion, and a cylindrical wall extending therebetween; oppositely disposed flanges formed in the cylindrical wall, wherein each respective flange has a respective flange aperture formed therethrough; a cylindrical plug controllably insertable through the first end portion into the valve body; and an at least partially hollow cylindrical drum rotatably connected within the main valve body, wherein the drum at least partially surrounds the plug and has a pair of oppositely disposed drum slots formed therethrough and defined by axial wall projections, the method including steps of:
    advancing a fluid through a fluid flow volume positioned in the main valve body and disposed between the respective aperture flanges;
    adjusting obstruction of the fluid flow volume by the plug by inserting or retracting the plug along a longitudinal axis of the valve body; and
    adjusting a flow coefficient of the fluid by rotating the drum about the plug to at least partially align the pair of oppositely disposed drum slots with the pair of oppositely disposed flange apertures.

2. The method of claim 1, further including attaching cylindrical fluid conduits at the oppositely disposed flanges.

3. The method of claim 2, further including positioning ends of the cylindrical fluid conduits in cylindrical recessed areas extending from an outer surface of the cylindrical wall to the respective flanges.

4. The method of claim 3, further including advancing the fluid through flange apertures having quadrilateral shapes.

5. The method of claim 2, further including adjusting the drum using a rotatable shaft extending through the second end and operationally connected to the drum.

6. The method of claim 5, further including rotating the rotatable shaft using an electric motor operationally connected to the rotatable shaft.

7. The method of claim 6, further including controlling operation of the electric motor using a microprocessor operationally connected to the electric motor.

8. An adjustable valve, including:
    a main valve body having a first end portion, an oppositely disposed second end portion, and a cylindrical wall extending therebetween,
    oppositely disposed flanges formed in the cylindrical wall for accepting cylindrical fluid conduits, wherein each respective flange has a respective flange aperture formed therethrough;
    a fluid flow volume within the main valve body and disposed between the respective flange apertures;
    a cylindrical plug controllably insertable through the first end portion into the valve body to at least partially obstruct the fluid flow volume;
    an at least partially hollow cylindrical drum rotatably connected within the main valve body, wherein the drum has a pair of oppositely disposed drum slots formed through a wall thereof and defined by axial wall projections; and
    a rotatable shaft extending through the second end portion and operationally connected to the drum;
    wherein the drum may at least partially surround the plug and be rotated to at least partially align the pair of oppositely disposed drum slots with the pair of oppositely disposed flange apertures to define an unobstructed fluid flow path through the valve body;
    wherein the plug is oriented along a longitudinal axis and is movable axially to modify a maximum flow volume corresponding to an outlet diameter of at least one of the cylindrical fluid conduits; and
    the drum is oriented along the longitudinal axis and is rotatable about the cylindrical plug to define a flow coefficient of a fluid.

9. The adjustable valve of claim 1, further including an electric motor operationally connected to the rotatable shaft.

10. The adjustable valve of claim 9, further including a microprocessor operationally connected to the electric motor.

11. The adjustable valve of claim 8, further including fluid conduits operationally connected to each respective flange and each respective end portion.

12. The adjustable valve of claim 8, wherein the flange apertures have quadrilateral shapes.

13. The adjustable valve of claim 12, wherein the flange apertures have square shapes.

14. The adjustable valve of claim 8, wherein the respective flanges are recessed relative to an outer surface of the cylindrical wall, and wherein a recessed area extending between the outer surface and each of the respective flanges have cylindrical shapes.

* * * * *